June 6, 1944.  F. DUMAREST  2,350,734
METHOD AND FURNACE FOR ELECTRICALLY MELTING GLASS
Filed April 10, 1942
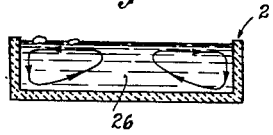
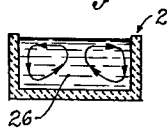
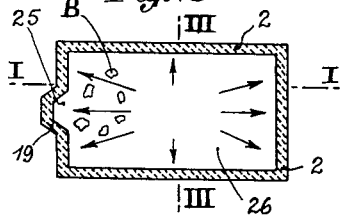
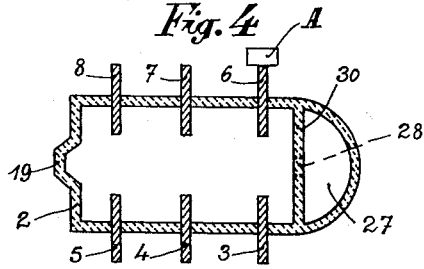
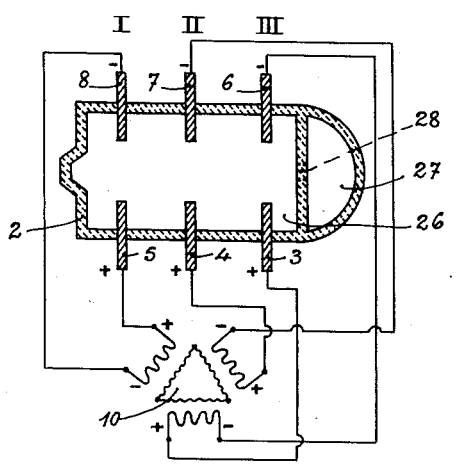
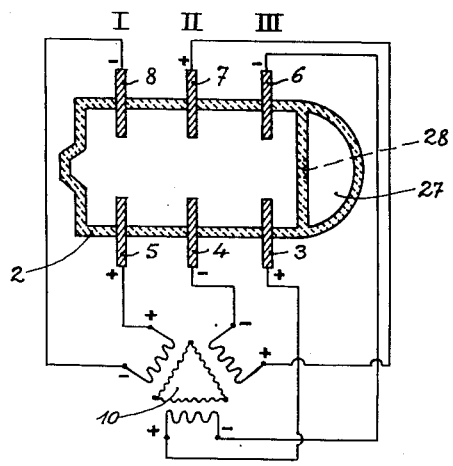
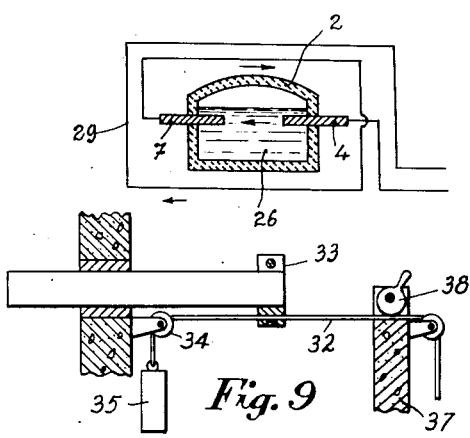
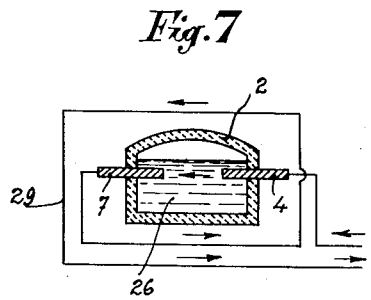
Inventor:
FRANÇOIS DUMAREST
By Haseltine, Lake & Co.
Attorneys.

Patented June 6, 1944

2,350,734

UNITED STATES PATENT OFFICE 2,350,734

METHOD AND FURNACE FOR ELECTRICALLY MELTING GLASS

François Dumarest, Lyon, Rhone, France; vested in the Alien Property Custodian

Application April 10, 1942, Serial No. 438,410
In France October 23, 1940

6 Claims. (Cl. 13—6)

The present invention relates to methods and furnaces for electrically melting glass by using a tank' or basin fitted with electrodes connected to a suitable source of electric current and so arranged that an arc is struck between them for generating heat so as to liquefy the mass of glass or vitreous material to be melted.

An object of the invention is to provide an improved method for melting glass with the aid of a tank or basin of the aforesaid type, this method involving a novel or improved mutual arrangement of the electrodes and leads and a novel manner of feeding current thereto with a view to setting up under the influence of the currents through the leads electrodynamic forces capable of re-acting upon the circulation of the mass of glass being melted, such circulation being due as is known to the different thermal effects on the several portions of said mass and taking place on the thermosyphon principle.

Another object of the invention is to provide an improved electric furnace of the aforesaid type comprising such a novel arrangement of the electrodes and leads feeding current thereto as to generate parallel currents capable of favorably influencing by an attractive or a repulsive electrodynamic effect the heat responsive circulatory motion of the mass of molten glass and of enabling a glass of finer quality to be obtained.

Another object of the invention is to provide a novel or improved electric furnace of the aforesaid type comprising such a new combination of electrodes set and associated pairwise face to face and of return leads connecting them back to a source of suitable current as to produce an electrodynamic action which will impart to the mass of molten glass circulatory impulse upwardly from the central hot point in the tank and downwardly back to said hot point.

A further object of the invention is to provide in an electric furnace of the aforesaid type such an improved arrangement of the electrodes and leads connected thereto as to localize adjacent the surface of the pool of molten glass such a blast of heat as to carry out and preserve fusion thereof under advantageous conditions.

A still further object of the invention is to provide in an electric furnace of the aforesaid type a novel arrangement of horizontally slidable and adjustable electrodes projecting well into the tank to a position adjacent its centre so as to concentrate the current lines in its middle region.

With these and such other objects in view as will incidentally appear hereafter, the invention comprises the novel steps as well as the novel construction and combination of elements that will now be described with reference to the accompanying diagrammatic drawing exemplifying the same and forming a part of the present disclosure.

In the drawing—

Figure 1 is a longitudinal sectional elevational view of an upwardly open glass-melting tank or basin, assuming the electrodes to be omitted, the section being taken on the line I—I of Fig. 2.

Figure 2 is a plan view corresponding to Fig. 1.

Figure 3 is a transverse sectional view on the line III—III of Fig. 1.

Figure 4 is a plan view of a slightly modified glass-melting tank or basin showing three pairs of electrodes engaged through its opposite longitudinal walls and arranged with their tips face to face pairwise.

Figure 5 is a plan view showing a tank or basin as illustrated in Fig. 4 and the wiring provided between the respective electrodes and the terminals of the windings of a three phase transformer.

Figure 6 is a plan view similar to Fig. 5 showing a slightly different way of connecting the electrodes to the terminals of the transformer windings.

Figure 7 is a transverse sectional view of a closed glass-melting tank or basin showing an arrangement of the leads connected to a pair of electrodes arranged face to face.

Figure 8 is a view similar to Fig. 7 showing a slightly modified arrangement of the leads.

Fig. 9 is a detail view showing one means for adjusting the electrodes of the furnace.

Like reference characters designate like parts throughout the several views.

The electric furnace shown comprises a rectangular melting tank or basin 2 of elongated shape which may have a construction similar to that of commonly built glass furnaces. In accordance with current practice, the tank or basin 2 is advantageously provided at one end with an inlet spout or "dog house" such as 19 defining a channel 25 through which is poured the mass of glass or vitreous material 26 to be melted or liquefied in the tank. At the opposite end of the tank may be provided as shown in Fig. 4 a "working basin" 27 defined by an arcuate end wall and communicating with the main space of the tank by an aperture 28 which may be in the form of a weir formed in a partition 30 separating the two basins from each other. The tank may be provided, moreover, with such suitable contrivances as a glass-gathering pipe which are not shown as they form no part of the invention.

The electrodes 3, 4, 5, 6, 7 and 8 through which the electric current is led may be made of carbon or graphite and are grouped into two sets, each comprising three electrodes projecting through the respective longitudinal walls of the basin 2. The electrodes are so arranged as to inwardly protrude well into the basin 2 and into the pool of molten glass slightly below its upper surface.

Each electrode is so mounted as to be horizontally movable along its axis so that it can be engaged to a greater or lesser extent into the enclosure defined by the surrounding walls of the basin 2. Each electrode may be cooled by any suitable form of water box (not shown) which forms no part of the invention.

In the illustrated embodiment, each of the six electrodes is connected to the terminals of the secondary windings of a three phase transformer 10 so that they receive current impulses which by a phenomenon of diffuse conductivity flow throughout the mass of glass being molten and heat the same by the known direct Joule action.

The electrodes are located so that their inner tips face each other as shown. The gaps between their inner tips may vary according to requirements and such gaps may also vary from one pair of electrodes to another. It will be understood that provided the electrodes project far enough into the tank 2 so as to leave between their inner tips comparatively short gaps, the current lines will be closer to one another between said tips than between the portions of the electrodes adjacent to the periphery of the tank. Consequently the evolution of heat is greater in the middle or central portion of the tank. This promotes the formation of a heat-responsive rising stream through the central portion of the mass of glass being molten and fosters the required circulatory motion thereof as depicted by the arrows in Figs. 1, 2 and 3.

As is well known, in an electric furnace of this class, it is generally advantageous to hasten this circulatory motion of the hot molten glass so as to use the latter as a vehicle carrying by convection the heat which is required for heating the fresh batches such as B of glass material charged into the basin by the spout 19. As will be understood, should this convection action be reduced, the subjacent layer of glass material is cooled by contacting with said fresh batches and thus becomes less conductive of the electric current so that the melting process is slowed down and the general efficiency of the furnace is curtailed.

In the electric furnace according to the invention, the mutual arrangement of the electrodes and leads respectively connected thereto is such as to set up electrodynamic actions which accelerate the heat responsive circulatory motion of the glass being molten by adding their effect to those of heat generated by direct Joule action as above described.

It is a well known electrical notion that two similarly directed parallel currents attract each other in direct ratio of the product of their intensities and in inverse ratio of the distance between them. If, however, the currents are oppositely directed, they repulse each other.

Where three phase alternative current is used to operate such a furnace, the parallel currents are similarly directed during two sixths of a cycle and oppositely directed during four sixths of the same cycle so that, as will be readily understood, the currents of two of the three phases respectively designated by I, II and III in Figs. 5 and 6 repulse each other most of the time. It follows from this fact that the repulsive action is preponderating.

The wiring should be effected preferably by taking into account the following explanations given in connection with the showings of Figs. 5 and 6: Assuming the source of alternating current to be a transformer such as 10 having six output terminals on its three secondary windings, a primary way of effecting the wiring is that shown in Fig. 5 wherein the three electrodes 3, 4, 5 located on the near side of the tank 2 are connected to the three positive terminals while the three electrodes 6, 7, 8 located on the far side of the tank are connected to the corresponding negative terminals of the respective transformer windings. It will be understood that between the electrodes 5, 8 tapped to phase I and the electrodes 4, 7 tapped to phase II is set up a repulsive action. However, as the glass between the electrodes 5, 8 is cooler than the glass between the electrodes 4, 7, it is less fluid and movable and thus drives the hotter glass towards the middle of the tank. This arrangement is not fully satisfactory. In order to obtain better results, the wiring shown in Fig. 6 should be preferably used. It will be seen that the middle electrode 4 located on the near side of the tank 2 is connected to the negative output terminal of the corresponding winding of transformer 10, while the middle electrode 7 located on the far side of the tank is connected to the positive output terminal of said winding. The two end electrodes 3 and 5 on the near side of the tank are in contrast connected to the positive output terminals of their respective additional transformer windings. This provides a so-called staggered coupling of the several electrodes with the source of current. Owing to this coupling, an attractive action is set up which draws the less movable cooler glass from between the electrodes 5, 8 towards the hotter glass between the electrodes 4, 7 and thus fosters the circulatory motion depicted by the arrows in Figs. 1, 2 and 3. The hotter portion of the glass in the tank is thus caused to come into contact with the fresh batches B of glass material introduced through the spout 19 into the tank and to preheat them. This improves the thermal efficiency of the furnace and accelerates the melting process without involving extra current expenditure.

The wiring arrangement shown in Fig. 6 presents the further advantage of providing for a satisfactory balance of the phase loads assuming the extent to which the electrodes project into the tank to be equal. Another advantage is that between the phases only half the tension prevails and the current longitudinally flowing along the tank walls is weaker since the furnace operates on the six phase principle. On the whole, this connecting system is therefore particularly advantageous.

An alternative way of connecting the electrodes would consist in negatively tapping the electrode 3 and positively tapping the oppositely located electrode 6. This alternative is not shown but it is so obvious to any one skilled in the art that it can be readily understood and carried into practice without requiring a special illustration. The advantage of this alternative arrangement lies in a still stronger acceleration of the circulatory motion of the glass as shown by the arrows in Figs. 1 to 3, because in this case a repulsive action is set up between the middle and right hand side phases II and III while a conjunctive action is set up between phases III and I. However, in order to ensure proper operation and suitable load and phase balance, the extents to which the electrodes project into the tank must be then rendered different, for example by means of adjusters such as the one diagrammatically shown at A in Fig. 4. One specific means for adjusting the electrode is shown in Fig. 9, wherein a flexible strap 32 is secured to the electrode by a collar 33 and passes over a pulley 34 adjacent the furnace wall and has secured thereto a weight 35. The opposite end portion of the strap 32 is adapted to be secured to a stationary post 37 by a cam 38.

An important feature resides in the fact that the leads feeding the current to the pairs of oppositely facing electrodes are so arranged as to lie over the major portion of their length in substantial parallelism with said electrodes so as to create electrodynamic actions capable of further promoting the circulatory motion of the glass.

By way of example, assuming the back lead from the middle electrode to the negative terminal of the transformer winding to extend underneath the furnace hearth, it will be understood that a repulsive action is generated which strongly repels the molten glass upwardly in the middle region of the tank since in this region more intense currents flow through the glass. This further hastens the circulatory motion and homogenizes the mass of molten glass.

The foregoing action may be still further enhanced by so shaping the back lead as to form one or more loops such as shown at 29 in Figs. 7 and 8, said loops extending parallel with the facing electrodes and passing over and under the tank 2 so as to surround it. The wiring as shown in Fig. 8 is so devised as to cause the electrodynamic effect of the current to produce a braking action capable of slowing down the circulatory motion of the glass where, somehow, it is too rapid and this would risk to jeopardize the quality of the resultant glass after completion of the melting process.

The above described electrodynamic effect may be produced also in glass furnaces heated by means of gas, coal, fuel oil or otherwise.

Minor constructional details of the improved furnace might be changed without departing from the scope of the subjoined claims.

Having now fully described my invention, I claim:

1. A method of electrically melting glass in a tank or basin having pairs of facing electrodes disposed substantially horizontally and inwardly shiftable through opposite walls of its periphery, comprising the step of so feeding current impulses individually from independent similar circuits to said pairs of electrodes by leads arranged substantially horizontally in parallelism thereto and to the surface of the glass that the parallel currents through said leads exert electrodynamically an attractive force promoting the circulation of the glass being melted in the tank.

2. A method of electrically melting glass in a tank or basin having pairs of facing electrodes disposed substantially horizontally inwardly shiftable through opposite walls of its perimeter, comprising the step of so feeding current impulses individually from distinct similar circuits to said pairs of electrodes by leads arranged in parallelism thereto and to the surface of the glass, that the parallel currents through said leads exert electrodynamically a repulsive force promoting the circulation of the glass being melted in the tank.

3. An electric furnace for melting glass, comprising a tank for the glass, pairs of horizontal electrodes movably projecting through opposite walls of the tank, said electrodes having their inner tips arranged face to face pairwise, a source of multi-phase alternating current individually feeding the pairs of electrodes, the number of pairs of electrodes being equal to the number of distinct phases, and leads interconnecting the terminals of opposite polarity of the several phases to the respective pairs of facing electrodes, at least a portion of each lead extending parallel to its pair of electrodes and to the surface of the glass, the wiring being such that on each side of the tank the polarity of an electrode is reverse to that of a consecutive electrode.

4. An electric furnace for melting glass, comprising a tank for the mass of glass material to be molten, sets of substantially horizontal electrodes horizontally slidable through opposite walls of the tank and having their inner tips facing each other pairwise, means for sliding the electrodes during operation, a source of alternating current having a number of distinct phases equal to the number of pairs of electrodes, leads interconnecting the current phases individually to the respective pairs of facing electrodes, said leads being in the form of loops passing under and over the tank and partly extending in substantial parallelism to the electrodes fed thereby and to the surface of the glass so that the reciprocal actions of the parallel currents through said leads perform an electrodynamic action favorizing the heat-responsive circulation of the glass being melted in the tank.

5. An electric furnace for melting glass, comprising a tank for the glass, substantially horizontal electrodes movably projecting through opposite walls of the tank, said electrodes having their inner tips arranged face to face pairwise, a multi-phase source of current, and leads arranged to least partly in parallelism to the surface of the glass and to each pair of facing electrodes and so interconnecting them individually to the respective distinct phases of the current source that the reciprocal actions of the parallel currents through said leads set up an electrodynamic attractive force fostering heat-responsive circulation of the glass being melted in the tank.

6. An electric furnace for melting glass, comprising a tank for the glass, three pairs of horizontal electrodes movably projecting through opposite walls of the tank, said electrodes having their inner tips arranged face to face pairwise, a source of three distinct phases of alternating current including a transformer having three pairs of terminals of opposite polarity, and leads interconnecting said terminals to the respective electrodes, the interconnections of the end pairs of electrodes being of reverse polarity to that of the middle pair of electrodes, a major portion of the length of each lead extending in parallelism to the surface of the glass and to the pair of electrodes fed thereby so as to electrodynamically influence the glass being melted in the tank by favorizing its heat-responsive circulatory motion.

FRANÇOIS DUMAREST.